(12) United States Patent
Lange et al.

(10) Patent No.: US 12,095,237 B2
(45) Date of Patent: Sep. 17, 2024

(54) SPARK GAP ARRANGEMENT WITH IGNITION APPARATUS FOR PROTECTING A HIGH-VOLTAGE DEVICE AND IGNITION APPARATUS THEREFOR

(71) Applicant: Siemens Energy Global GmbH & Co. KG, Munich (DE)

(72) Inventors: Dennie Lange, Erlangen (DE); Michael Soeder, Heroldsbach (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 219 days.

(21) Appl. No.: 17/477,793

(22) Filed: Sep. 17, 2021

(65) Prior Publication Data

US 2022/0085579 A1  Mar. 17, 2022

(30) Foreign Application Priority Data

Sep. 17, 2020 (EP) .................................. 20196585

(51) Int. Cl.
*H01T 15/00* (2006.01)
*H01T 2/02* (2006.01)
*H02H 9/06* (2006.01)

(52) U.S. Cl.
CPC .............. *H01T 15/00* (2013.01); *H01T 2/02* (2013.01); *H02H 9/06* (2013.01)

(58) Field of Classification Search
CPC .. H01T 15/00; H01T 2/02; H01T 4/16; H02H 9/06
USPC ....................................... 315/238; 123/143 R
See application file for complete search history.

(56) References Cited

U.S. PATENT DOCUMENTS

| 2,764,684 A | * | 9/1956 | Mayer | ....................... H03F 1/54 |
| | | | | 315/238 |
| 3,448,337 A | * | 6/1969 | Kawiecki | .................. H01T 2/02 |
| | | | | 361/120 |
| 3,505,563 A | * | 4/1970 | Maycock | ................ F02P 7/035 |
| | | | | 315/213 |
| 3,679,939 A | * | 7/1972 | Nitta | ......................... H01T 2/02 |
| | | | | 315/330 |

(Continued)

FOREIGN PATENT DOCUMENTS

| EP | 2747232 A1 | 6/2014 |
| WO | WO 2015113793 A1 | 8/2015 |

*Primary Examiner* — Logan M Kraft
*Assistant Examiner* — Joshua Campbell
(74) *Attorney, Agent, or Firm* — Laurence A. Greenberg; Werner H. Stemer; Ralph E. Locher

(57) ABSTRACT

An ignition apparatus for a spark gap arrangement containing at least a first and a second ignition capacitor for voltage division of a voltage between a first and a second electrode of the spark gap arrangement. A first trigger spark gap is arranged in a first parallel branch with respect to the first ignition capacitor, and a second trigger spark gap is arranged in a second parallel branch with respect to the second ignition capacitor. A first ignition resistor is disposed in the first parallel branch, wherein a first potential point between the first ignition resistor and the first trigger spark gap is connected to an ignition electrode of the second trigger spark gap. Furthermore, a spark gap arrangement containing the ignition apparatus, an arrangement containing a high-voltage device and the spark gap arrangement for protecting the high-voltage device, and a method for igniting the spark gap arrangement are disclosed.

11 Claims, 3 Drawing Sheets

(56) References Cited

U.S. PATENT DOCUMENTS

| | | | | |
|---|---|---|---|---|
| 4,860,156 A | * | 8/1989 | Stenstrom | H02H 7/16 |
| | | | | 361/13 |
| 9,531,166 B2 | | 12/2016 | Poeyhoenen | |
| 2014/0175995 A1 | * | 6/2014 | Poyhonen | H02H 9/06 |
| | | | | 315/187 |
| 2014/0320036 A1 | | 10/2014 | Liu et al. | |
| 2018/0198260 A1 | * | 7/2018 | Bobert | H02H 9/06 |

\* cited by examiner

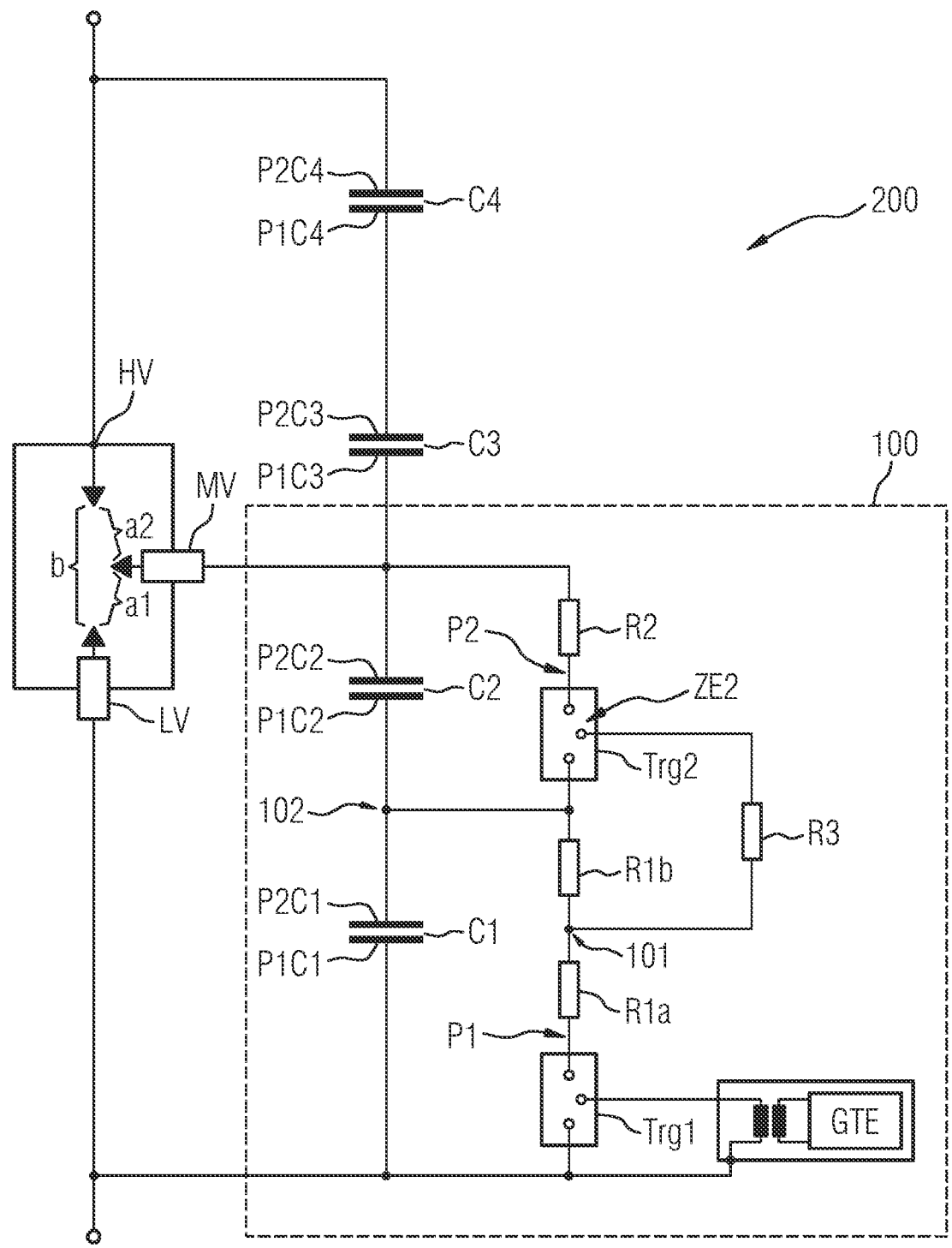

SPARK GAP ARRANGEMENT WITH IGNITION APPARATUS FOR PROTECTING A HIGH-VOLTAGE DEVICE AND IGNITION APPARATUS THEREFOR

CROSS-REFERENCE TO RELATED APPLICATION

This application claims the priority, under 35 U.S.C. § 119, of European Patent Application EP20196585, filed Sep. 17, 2020; the prior application is herewith incorporated by reference in its entirety.

FIELD AND BACKGROUND OF THE INVENTION

The invention relates to an ignition apparatus for a spark gap arrangement containing at least a first and a second ignition capacitor for voltage division of a voltage between a first and a second electrode of the spark gap arrangement, a first trigger spark gap arranged in a first parallel branch with respect to the first ignition capacitor, and a second trigger spark gap arranged in a second parallel branch with respect to the second ignition capacitor. For the voltage division, in a suitable manner, a first pole of the first ignition capacitor is connectable, or connected during operation, to a first electrode of the spark gap arrangement, a second pole of the first ignition capacitor is connectable, or connected during operation, to a first pole of the second ignition capacitor and a second pole of the second ignition capacitor is connectable, or connected during operation, to a second electrode of the spark gap arrangement.

In arrangements containing high-voltage devices, such as series compensation installations (FSC), for example, spark gaps are usually used for protecting the high-voltage devices, in particular the capacitor and arrester banks. At relatively high voltage levels (particularly in the case of possible peak voltages above 100 kV or even 15 kV), a cascaded ignition of a plurality of trigger spark gaps is necessary in spark gaps constructed in the manner described above. In order to ignite a plurality of trigger spark gaps connected in series, ignition transformers (ignition coils) are usually used. The ignition transformers are a comparatively sensitive component under high-voltage conditions. A defective ignition transformer can result in ignition failures or an undesirably high ignition delay in the spark gap.

One example of an ignition apparatus according to the prior art is illustrated in FIG. 1. The ignition apparatus 1 serves for igniting a spark gap having a first electrode (low-voltage electrode LV), a second electrode (medium-voltage electrode or ignition electrode MV) and a third electrode (high-voltage electrode HV). The spark gap arrangement is connected in parallel with the high-voltage device to be protected, such that during operation of the entire arrangement, at least at times, the first electrode is at a low voltage potential and the third electrode is at a high voltage potential. Voltage division of the entire voltage difference between the low voltage potential and the high voltage potential is effected by use of four ignition capacitors C1-C4.

For actively igniting the spark gap b, the ignition circuit or the ignition apparatus 1 with the ignition electrode (MV) is provided, wherein the ignition circuit has a capacitive voltage divider containing two ignition capacitors C1 and C2. The ignition capacitors C1 and C2 are each able to be bridged by a parallel branch in which a trigger spark gap Trg1 and Trg2, respectively, and, connected in series therewith, an ohmic resistor R1 and R2, respectively, are arranged. An ignition transformer in the form of an ignition coil Z1 is additionally incorporated in the lower part of the ignition circuit, the ignition transformer being connected to the second trigger spark gap Trg2. The lower trigger spark gap Trg1 is brought to a conducting state by a high-voltage pulse generated by ignition electronics GTE (Gap Trigger Electronics) controlled by a protection device. The conducting state of Trg1 causes a current flow via a first parallel branch (Trg1, R1 and Z1) and thus bridging of the ignition capacitor C1. A high-voltage pulse is generated as a result of the current flow in Z1 and brings a second trigger spark gap Trg2 to a conducting state. As a result of the current flow via a second parallel branch (Trg2, R2), the ignition capacitor C2 is also bridged. As a result of the bridging of C1 and C2, the ignition electrode MV acquires the potential of the first electrode (lower main electrode) LV, thus resulting in sparkover of a spark discharge to the third electrode (upper main electrode) HV via a spark gap a2. The upper capacitors C3 and C4 are bridged by the arc, as a result of which the ignition capacitors C1 and C2 are charged again until a spark discharge arises between the ignition electrode MV and the lower main electrode LV via the spark gap a1. The spark gap b is thus ignited.

An ignition apparatus of such a type is known from European patent application EP 2 747 232 A1, corresponding to U.S. Pat. No. 9,531,166, for example.

SUMMARY OF THE INVENTION

The object of the invention is to specify an ignition apparatus of the generic type which is as cost-effective and as reliable as possible.

For an ignition apparatus of the generic type the object is achieved according to the invention by virtue of the fact that provision is made of a first ignition resistor (ignition resistance element) in the first parallel branch, wherein a first potential point between the first ignition resistor and the first trigger spark gap is connected to an ignition electrode of the second trigger spark gap. The ohmic ignition resistor is used instead of an ignition transformer or an ignition coil. If the first trigger spark gap is brought to a conducting state, a voltage is dropped across the first ignition resistor and thus across the second trigger spark gap, which voltage results in the ignition of the second trigger spark gap and thus brings the latter to a conducting state. Accordingly, the triggering of the second trigger spark gap is effected without ignition coils by means of the voltage (ignition voltage) present at the first ignition resistor. A high-voltage pulse (i.e. a great voltage change), as in the arrangement according to FIG. 1, is accordingly not required for the ignition of the second trigger spark gap. A connection between a second potential point, situated between the first and second ignition capacitors, and the ignition electrode accordingly leads via the first ignition resistor.

The ignition of the second trigger spark gap exclusively via an ohmic resistor (ignition resistor) affords the advantage that there is no need to use an ignition transformer (ignition coil). An ignition transformer is a technically more complex and more cost-intensive component than an ohmic resistor. The technical construction is significantly simplified by the invention, thereby resulting in a cost advantage, and is thus less susceptible to wear and hence particularly reliable.

In a suitable manner, the first trigger spark gap is ignitable by means of ignition electronics (GTE). The ignition electronics can comprise for example a controllable semiconductor switch (e.g. IGBT) and a transformer (as far as possible with a steep rising edge). The ignition electronics can be controlled by means of a control device that reacts to predetermined fault signals.

Expediently, the ignition apparatus can furthermore comprise a second ignition resistor arranged in the first parallel branch between the first potential point and the first trigger spark gap. In other words, in this case, the total ignition resistance is divided between the first and second ignition resistors.

In order that the discharge current does not flow via the second trigger spark gap after ignition, a further resistor can additionally be used. In accordance with one embodiment of the invention, the ignition apparatus accordingly contains a third ignition resistor arranged in the connection of the first potential point to the ignition electrode of the second trigger spark gap.

The invention furthermore relates to a spark gap arrangement containing a first electrode, a second electrode and a third electrode. Wherein a first spark gap between the first and second electrodes and a second spark gap between the second and third electrodes are in each case smaller (in the sense of a smaller electrode spacing) than a third spark gap between the first and third electrodes. The second electrode is also referred to as ignition electrode.

The object of the invention is to propose such a spark gap arrangement which can be ignited as cost-effectively and reliably as possible.

The object is achieved according to the invention by means of an ignition apparatus according to the invention.

The advantages of the spark gap arrangement according to the invention are evident analogously from the advantages already described in association with the ignition apparatus according to the invention. The spark gap according to the invention is advantageously ignitable in less than 1 ms.

In accordance with one embodiment of the invention, the spark gap arrangement contains a third ignition capacitor and a fourth ignition capacitor, wherein a first pole of the third ignition capacitor is connected to the second electrode, a second pole of the third ignition capacitor is connected to a first pole of the fourth ignition capacitor, a second pole of the fourth ignition capacitor is connected to the third electrode.

The invention furthermore relates to an arrangement containing a high-voltage device.

The object of the invention is to propose such an arrangement which is protected as well as possible in the case of a fault.

For an arrangement of the generic type the object is achieved according to the invention by virtue of the fact that a spark gap arrangement according to the invention is provided for protecting the high-voltage device.

The high-voltage device can comprise for example a high-voltage capacitor arrangement (FSC), in particular a series capacitance for grid stabilization (Fixed Series Capacitor, FSC), wherein the spark gap arrangement is arranged in a parallel connection with respect to the high-voltage capacitor arrangement.

The arrangement can furthermore comprise a surge arrester (e.g. in the form of an arrester bank) arranged in a parallel connection with respect to the high-voltage capacitor arrangement. In the case of a fault, the surge arrester can limit the voltage across the high-voltage device in order to protect the latter, part of the energy being absorbed by the arrester. Preferably, at the same time as the ignition command to the spark gap, a closing command is given to a bypass switch likewise arranged in parallel with the high-voltage device. The period of time until switch-on of the bypass switch is usually (at least) a multiple of the period of time until ignition of the spark gap.

The invention furthermore relates to a method for igniting the spark gap arrangement.

The object of the invention is to specify such a method which is as reliable as possible.

For a method of the generic type the object is achieved according to the invention by virtue of the fact that the method is carried out by means of an ignition apparatus according to the invention, wherein the ignition of the second trigger spark gap is effected without ignition coils by means of a voltage present at the first ignition resistor.

The advantages of the method according to the invention correspond in particular to those advantages which have been described above in association with the ignition apparatus according to the invention and the spark gap arrangement according to the invention.

Other features which are considered as characteristic for the invention are set forth in the appended claims.

Although the invention is illustrated and described herein as embodied in a spark gap arrangement with an ignition apparatus for protecting a high-voltage device and an ignition apparatus therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 3 is a schematic illustration of an exemplary embodiment of a spark gap arrangement with an ignition apparatus according to the invention.

DETAILED DESCRIPTION OF THE INVENTION

Figure 1:
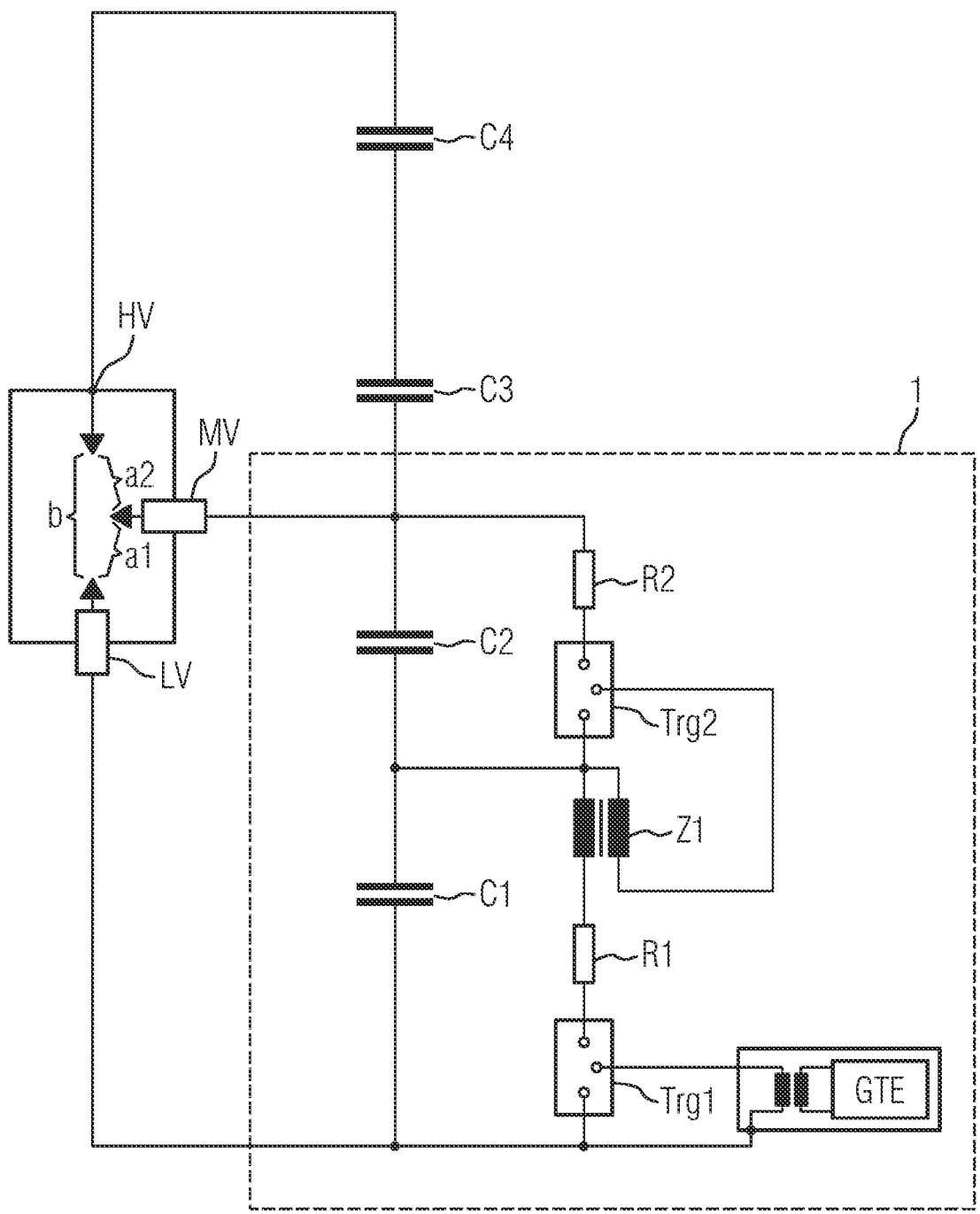
FIG. 1 is a schematic illustration of an ignition apparatus according to the prior art.
Figure 2:
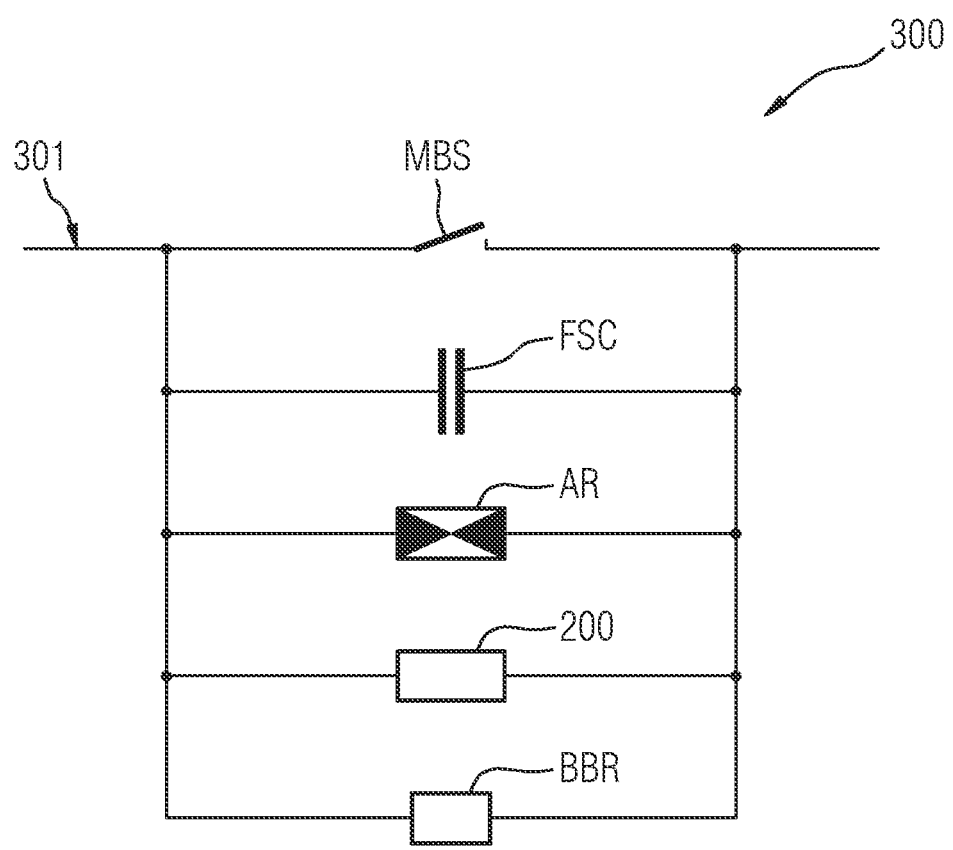
FIG. 2 is a schematic illustration of one exemplary embodiment of an arrangement according to the invention.

Referring now to the figures of the drawings in detail and first, particularly to FIG. 2 thereof, there is shown an arrangement 300 containing a series capacitor FSC inserted serially into a DC voltage system 301. A surge arrester AR, a bypass switch BBR and a spark gap arrangement 200, the construction of which will be discussed in more specific detail in FIG. 3 hereinafter, are arranged in a parallel connection with respect to the series capacitor FSC. A disconnecting switch MBS (Main Bypass Switch) is additionally provided.

FIG. 3 illustrates the spark gap arrangement 200. The entire voltage present at the high-voltage device (e.g. a high-voltage capacitor, cf. FIG. 2) to be protected by means of the spark gap arrangement 200 is divided by means of four ignition capacitors C1-C4. For this purpose, a first pole (P101) of the first ignition capacitor (01) is connected to the first electrode (LV), a second pole (P201) of the first ignition capacitor (01) is connected to a first pole (P102) of the second ignition capacitor (C2), a second pole (P2C2) of the second ignition capacitor (C2) and a first pole (P103) of the third ignition capacitor (C3) are each connected to the second electrode (MV), a second pole (P2C3) of the third ignition capacitor (C3) is connected to a first pole (P104) of the fourth ignition capacitor (C4), and a second pole (P2C4) of the fourth ignition capacitor (C4) is connected to the third electrode (HV). The spark gap arrangement 200 comprises a first electrode (low-voltage electrode LV), a second electrode (medium-voltage electrode or ignition electrode MV) and a third electrode (high-voltage electrode HV). A (main or third) spark gap b is set to be in each case larger (spacing between the electrodes) than a first and second spark gap a1 and a2, respectively.

For actively igniting the spark gap b between the first and third electrodes LV, HV, an ignition apparatus 100 is provided. The ignition apparatus 100 contains a capacitive voltage divider comprising a first and second ignition capacitors C1 and C2. The first ignition capacitor C1 is able to be bridged by means of a first parallel branch P1, and the second ignition capacitor C2 is able to be bridged by means of a second parallel branch P2. A first trigger spark gap Trg1, a first ignition resistor R1a and a second ignition resistor R1b are arranged in the first parallel branch P1. A second trigger spark gap Trg2 and a further ohmic resistance element R2 are arranged in the second parallel branch P2.

The ignition apparatus 100 furthermore contains a connection between a first potential point 101 between the first ignition resistor R1b and the first trigger spark gap Trg1 and an ignition electrode ZE2 of the second trigger spark gap Trg2. A second potential point 102 between the first and second ignition capacitors C1 and C2 is accordingly connected to the first potential point 101 via the first ignition resistor R1b. Therefore, a connection between the second potential point 102 and the ignition electrode ZE2 always leads via the first ignition resistor R1b.

The functioning of the spark gap arrangement 200 or of the ignition apparatus 100 can be described as follows. The first trigger spark gap Trg1 is ignited or brought to a conducting state by a high-voltage pulse generated by means of ignition electronics GTE (Gap Trigger Electronics) controlled by a protection device. The conducting state Trg1 causes a current flow via a first parallel branch (Trg1, R1a and R1b) and thus bridging of the ignition capacitor C1. If the trigger spark gap Trg1 is brought to a conducting state, a voltage is dropped across the first ignition resistor R1b and thus across the trigger spark gap Trg2 (or between the potential point 101 and the ignition electrode ZE2), which voltage results in the ignition of the second trigger spark gap Trg2 and thus brings the latter to a conducting state. In order that the discharge current does not flow via the trigger spark gap Trg2 after ignition, a resistor R3 is additionally provided. As a result of the current flow via the second parallel branch P2, the second ignition capacitor C2 is also bridged. On account of the bridging of the two ignition capacitors C1 and C2, the ignition electrode MV acquires the potential of the first electrode LV. The entire voltage of the component to be protected (high-voltage device) is then dropped across C3 and C4. This causes a spark discharge to the third electrode HV via the spark gap a2. The upper capacitors C3 and C4 are bridged by an arc generated or produced in this way, as a result of which the ignition capacitors C1 and C2 are charged again, specifically until a spark discharge arises between the ignition electrode MV and the first main electrode LV via the spark gap a1. The entire spark gap b is thus ignited with a delay time of less than 1 ms. The spark gap arrangement 200 can thus protect the high-voltage device against overloads in the case of a fault. The arc is quenched again by means of a bypass circuit-breaker.

The invention claimed is:

1. An ignition apparatus for a spark gap configuration, the ignition apparatus comprising:
    at least a first ignition capacitor and a second ignition capacitor for voltage division of a voltage between a first electrode and a second electrode of the spark gap configuration;
    a first trigger spark gap disposed in a first parallel branch with respect to said first ignition capacitor;
    a second trigger spark gap disposed in a second parallel branch with respect to said second ignition capacitor and having an ignition electrode; and
    a first ignition resistor disposed in said first parallel branch, wherein a first potential point between said first ignition resistor and said first trigger spark gap is connected to said ignition electrode of said second trigger spark gap.

2. The ignition apparatus according to claim 1, further including ignition electronics, said first trigger spark gap is ignitable by means of said ignition electronics.

3. The ignition apparatus according to claim 1, further comprising a second ignition resistor disposed in said first parallel branch between said first potential point and said first trigger spark gap.

4. The ignition apparatus according to claim 1, further comprising a third ignition resistor disposed in said connection of said first potential point to said ignition electrode of said second trigger spark gap.

5. The ignition apparatus according to claim 1, where a voltage dropped across said first ignition resistor is dropped across said second trigger spark gap.

6. A spark gap configuration, comprising:
    a first electrode;
    a second electrode;
    a third electrode;
    a first spark gap disposed between said first and second electrodes and a second spark gap disposed between said second and third electrodes are in each case smaller than a third spark gap disposed between said first and third electrodes; and
    an ignition apparatus, containing:
        at least a first ignition capacitor and a second ignition capacitor for voltage division of a voltage between said first electrode and said second electrode;
        a first trigger spark gap disposed in a first parallel branch with respect to said first ignition capacitor;
        a second trigger spark gap disposed in a second parallel branch with respect to said second ignition capacitor and having an ignition electrode; and
        a first ignition resistor disposed in said first parallel branch, wherein a first potential point between said first ignition resistor and said first trigger spark gap is connected to said ignition electrode of said second trigger spark gap.

7. The spark gap configuration according to claim 6, further comprising:
    a third ignition capacitor having a first pole and a second pole;
    a fourth ignition capacitor having a first pole and a second pole, wherein said first pole of said third ignition capacitor is connected to said second electrode, said second pole of said third ignition capacitor is connected to said first pole of said fourth ignition capacitor, and said second pole of said fourth ignition capacitor is connected to said third electrode.

8. A configuration, comprising:
    a high-voltage device; and said spark gap configuration according to claim 5 provided for protecting said high-voltage device.

9. The configuration according to claim 8, wherein said high-voltage device contains a high-voltage capacitor configuration, wherein said spark gap configuration is disposed in a parallel connection with respect to said high-voltage capacitor configuration.

10. The configuration according to claim 9, further comprising a surge arrester disposed in a parallel connection with respect to said high-voltage capacitor configuration.

11. A method for igniting a spark gap configuration, by means of an ignition apparatus, the ignition apparatus containing:

- at least a first ignition capacitor and a second ignition capacitor for voltage division of a voltage between a first electrode and a second electrode of the spark gap configuration;
- a first trigger spark gap disposed in a first parallel branch with respect to said first ignition capacitor;
- a second trigger spark gap disposed in a second parallel branch with respect to said second ignition capacitor and having an ignition electrode; and
- a first ignition resistor disposed in said first parallel branch, wherein a first potential point between said first ignition resistor and said first trigger spark gap is connected to said ignition electrode of said second trigger spark gap;

the method comprises the step of:

effecting an ignition of the second trigger spark gap without ignition coils by means of a voltage present at the first ignition resistor.

* * * * *